(12) United States Patent
Lee et al.

(10) Patent No.: US 12,095,609 B2
(45) Date of Patent: Sep. 17, 2024

(54) METHOD AND APPARATUS FOR BEAM-SPECIFIC DOWNLINK/UPLINK OPERATION

(71) Applicant: Samsung Electronics Co., Ltd., Suwon-si (KR)

(72) Inventors: Gilwon Lee, Plano, TX (US); Ebrahim MolavianJazi, Santa Clara, CA (US); Joonyoung Cho, Portland, OR (US); Jeongho Jeon, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/151,090

(22) Filed: Jan. 15, 2021

(65) Prior Publication Data

US 2021/0344558 A1 Nov. 4, 2021

Related U.S. Application Data

(60) Provisional application No. 63/078,501, filed on Sep. 15, 2020, provisional application No. 63/048,385, filed on Jul. 6, 2020, provisional application No. 63/019,131, filed on May 1, 2020.

(51) Int. Cl.
| | |
|---|---|
| *H04L 41/0803* | (2022.01) |
| *H04B 7/0404* | (2017.01) |
| *H04B 7/0408* | (2017.01) |
| *H04B 7/06* | (2006.01) |
| *H04L 5/00* | (2006.01) |
| *H04L 5/14* | (2006.01) |
| *H04W 72/232* | (2023.01) |

(52) U.S. Cl.
CPC ....... *H04L 41/0803* (2013.01); *H04B 7/0408* (2013.01); *H04L 5/14* (2013.01)

(58) Field of Classification Search
CPC ...... H04L 41/0803; H04L 5/14; H04B 7/0408
USPC ......................................................... 370/254
See application file for complete search history.

(56) References Cited

U.S. PATENT DOCUMENTS

| | | | |
|---|---|---|---|
| 2018/0083680 A1* | 3/2018 | Guo .................... | H04L 5/0007 |
| 2018/0205469 A1 | 7/2018 | Nagaraja et al. | |
| 2018/0309513 A1 | 10/2018 | Kim et al. | |
| 2019/0215828 A1* | 7/2019 | Kim .................... | H04W 74/00 |

(Continued)

FOREIGN PATENT DOCUMENTS

| | | | |
|---|---|---|---|
| WO | 2018097680 A1 | | 5/2018 |
| WO | WO-2020168334 A1 | * | 8/2020 |
| WO | WO-2020218254 A1 | * | 10/2020 |

OTHER PUBLICATIONS

International Search Report of the International Searching Authority in connection with International Application No. PCT/KR2021/005391 issued Aug. 2, 2021, 3 pages.

(Continued)

*Primary Examiner* — Xuan Lu

(57) ABSTRACT

A method for a beam-specific operation between a base station (BS) and a user equipment (UE) is provided. The method comprises obtaining a configuration for at least one of a downlink (DL) reception or an uplink (UL) transmission, wherein the configuration comprises beam identifiers (IDs) and a slot and symbol configuration for respective ones of the one or more beam IDs. The method further includes performing, according to the configuration information, a DL operation or an UL operation.

20 Claims, 12 Drawing Sheets

(56) References Cited

U.S. PATENT DOCUMENTS

| | | |
|---|---|---|
| 2019/0297603 A1 | 9/2019 | Guo et al. |
| 2020/0287676 A1* | 9/2020 | Jo .................... H04W 72/0413 |
| 2021/0144564 A1* | 5/2021 | Nam .................... H04W 72/53 |
| 2023/0148282 A1* | 5/2023 | Marinier ........... H04W 72/0446 |
| | | 370/329 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"3rd Generation Partnership Project; Technical Specification Group Radio Access Network; NR; Physical layer measurements (Release 16)", 3GPP TS 38.215 v16.1.0, Mar. 2020, 22 pages.

"3rd Generation Partnership Project; Technical Specification Group Radio Access Network; NR; Medium Access Control (MAC) protocol specification (Release 16)", 3GPP TS 38.321 v16.0.0, Mar. 2020, 141 pages.

"3rd Generation Partnership Project; Technical Specification Group Radio Access Network; NR; Radio Resource Control (RRC) protocol specification (Release 16)", 3GPP TS 38.331 v16.0.0, Mar. 2020, 835 pages.

"3rd Generation Partnership Project; Technical Specification Group Radio Access Network; Evolved Universal Terrestrial Radio Access (E-UTRA); Physical channels and modulation (Release 16)", 3GPP TS 36.211 v16.1.0, Mar. 2020, 247 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 v16.1.0, Mar. 2020, 253 pages.

"3rd Generation Partnership Project; Technical Specification Group Radio Access Network; Evolved Universal Terrestrial Radio Access (E-UTRA); Physical layer procedures (Release 16)", 3GPP TS 36.213 v16.1.0, Mar. 2020, 570 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 v16.0.0, Mar. 2020, 141 pages.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 v16.0.0, Mar. 2020, 1,048 pages.

Extended European Search Report issued Jul. 26, 2023 regarding Application No. 21796753.8, 6 pages.

* cited by examiner

METHOD AND APPARATUS FOR BEAM-SPECIFIC DOWNLINK/UPLINK OPERATION

CROSS-REFERENCE TO RELATED APPLICATIONS AND CLAIM OF PRIORITY

The present application claims priority to U.S. Provisional Patent Application No. 63/019,131 filed on May 1, 2020, U.S. Provisional Patent Application No. 63/048,385, filed on Jul. 6, 2020, and U.S. Provisional Patent Application No. 63/078,501 filed on Sep. 15, 2020. The content of the above-identified patent documents is incorporated herein by reference.

TECHNICAL FIELD

The present disclosure relates to electronic devices and methods on beam-specific DL/UL operation, more particularly, to electronic devices and methods on dynamically allocating different DL/UL operations for different beam links in wireless networks.

BACKGROUND

A basic philosophy of New Radio (NR) in $3^{rd}$ Generation Partnership Project (3GPP) is to support beam-specific operations for wireless communication between a gNode B (gNB) and a user equipment (UE). There are several components in the 5G (e.g., fifth generation) NR specification that can efficiently be operated in a beam-specific manner; but that currently do not allow beam specific operations.

SUMMARY

Embodiments of the present disclosure provide methods and apparatuses for full power UL MIMO operation in an advanced wireless communication system.

In one embodiment, a user equipment (UE) is provided. The UE includes a transceiver configured to communicate via a multi-beam operation with a base station. The UE further includes a processor configured to: receive, via the transceiver, configuration information for at least one of a downlink (DL) reception or an uplink (UL) transmission, wherein the configuration information comprises beam identifiers (IDs) and a slot and symbol configuration for respective ones of the one or more beam IDs, and control the transceiver to perform, according to the configuration information, a DL operation or an UL operation.

In another embodiment, a base station (BS) is provided. The BS includes a transceiver configured to communicate with at least one user equipment (UE) via a multi-beam operation. The BS further includes a processor operably coupled to the transceiver, the processor configured to transmit, via the transceiver, configuration information for at least one of a downlink (DL) reception or an uplink (UL) transmission, wherein the configuration information comprises beam identifiers (IDs) and a slot and symbol configuration for respective ones of the one or more beam IDs, and control the transceiver to perform, according to the configuration information, a DL operation or an UL operation.

In yet another embodiment, a method for a beam-specific operation between a base station (BS) and a user equipment (UE) is provided. The method comprises obtaining configuration information for at least one of a downlink (DL) reception or an uplink (UL) transmission, wherein the configuration information comprises beam identifiers (IDs) and a slot and symbol configuration for respective ones of the one or more beam IDs. The method further includes performing, according to the configuration information, a DL operation or an UL operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
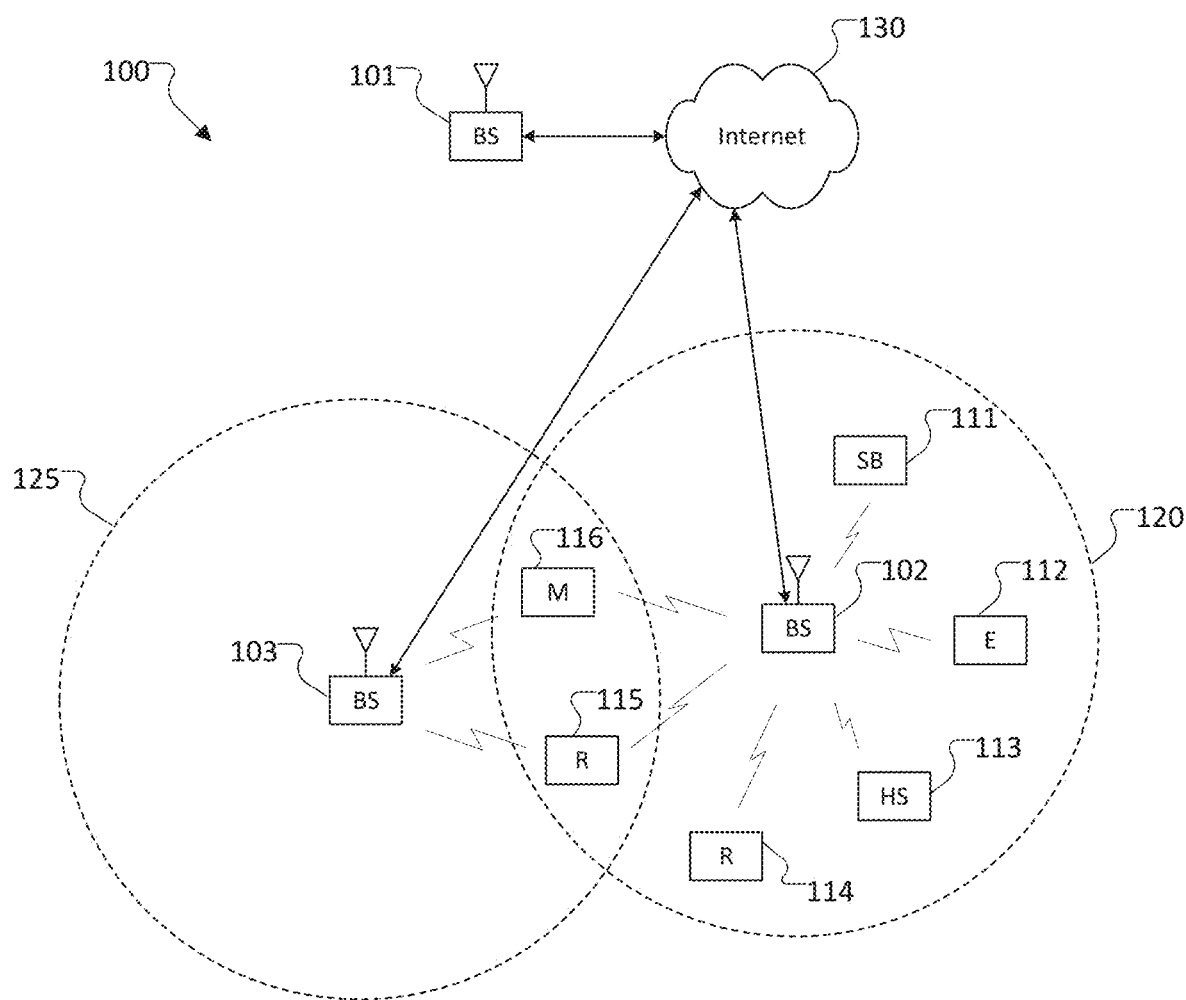
FIG. 1 illustrates an example wireless network according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.1.0, "E-UTRA, Physical channels and modulation;" 3GPP TS 36.212 v16.1.0, "E-UTRA, Multiplexing and Channel coding;" 3GPP TS 36.213 v16.1.0, "E-UTRA, Physical Layer Procedures;" 3GPP TS 36.321 v16.0.0, "E-UTRA, Medium Access Control (MAC) protocol specification;" 3GPP TS 36.331 v16.0.0, "E-UTRA, Radio Resource Control (RRC) protocol specification;" 3GPP TS 38.211 v16.1.0, "NR, Physical channels and modulation;" 3GPP TS 38.212 v16.1.0, "NR, Multiplexing and Channel coding;" 3GPP TS 38.213 v16.1.0, "NR, Physical Layer Procedures for control;" 3GPP TS 38.214 v16.1.0, "NR, Physical layer procedures for data;" 3GPP TS 38.215 v16.1.0, "NR, Physical Layer Measurements;" 3GPP TS 38.321 v16.0.0, "NR, Medium Access Control (MAC) protocol specification;" and 3GPP TS 38.331 v16.0.0, "NR, Radio Resource Control (RRC) protocol specification."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying (FSK) and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
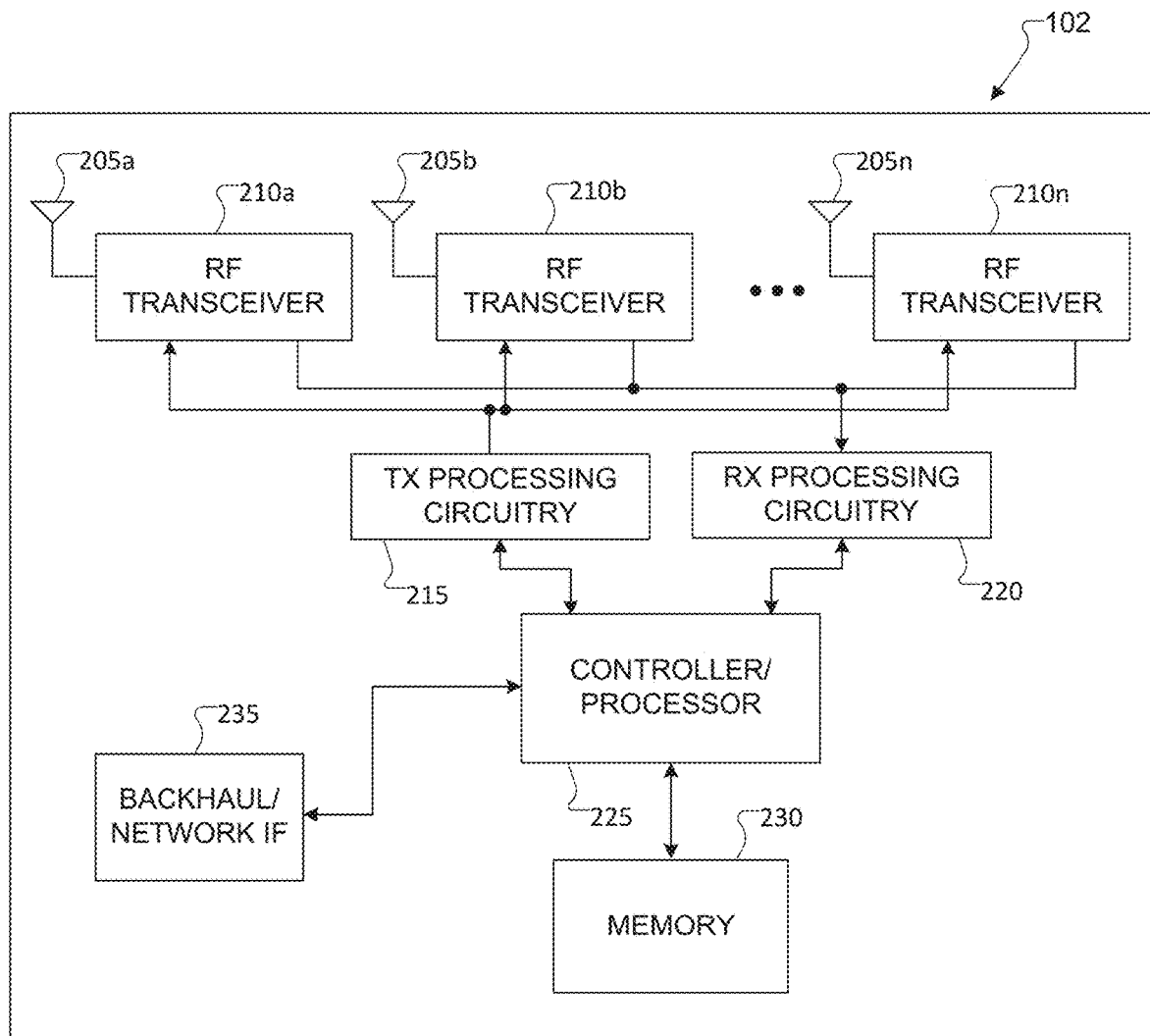
FIG. 2 illustrates an example gNB according to embodiments of the present disclosure.
Figure 3:
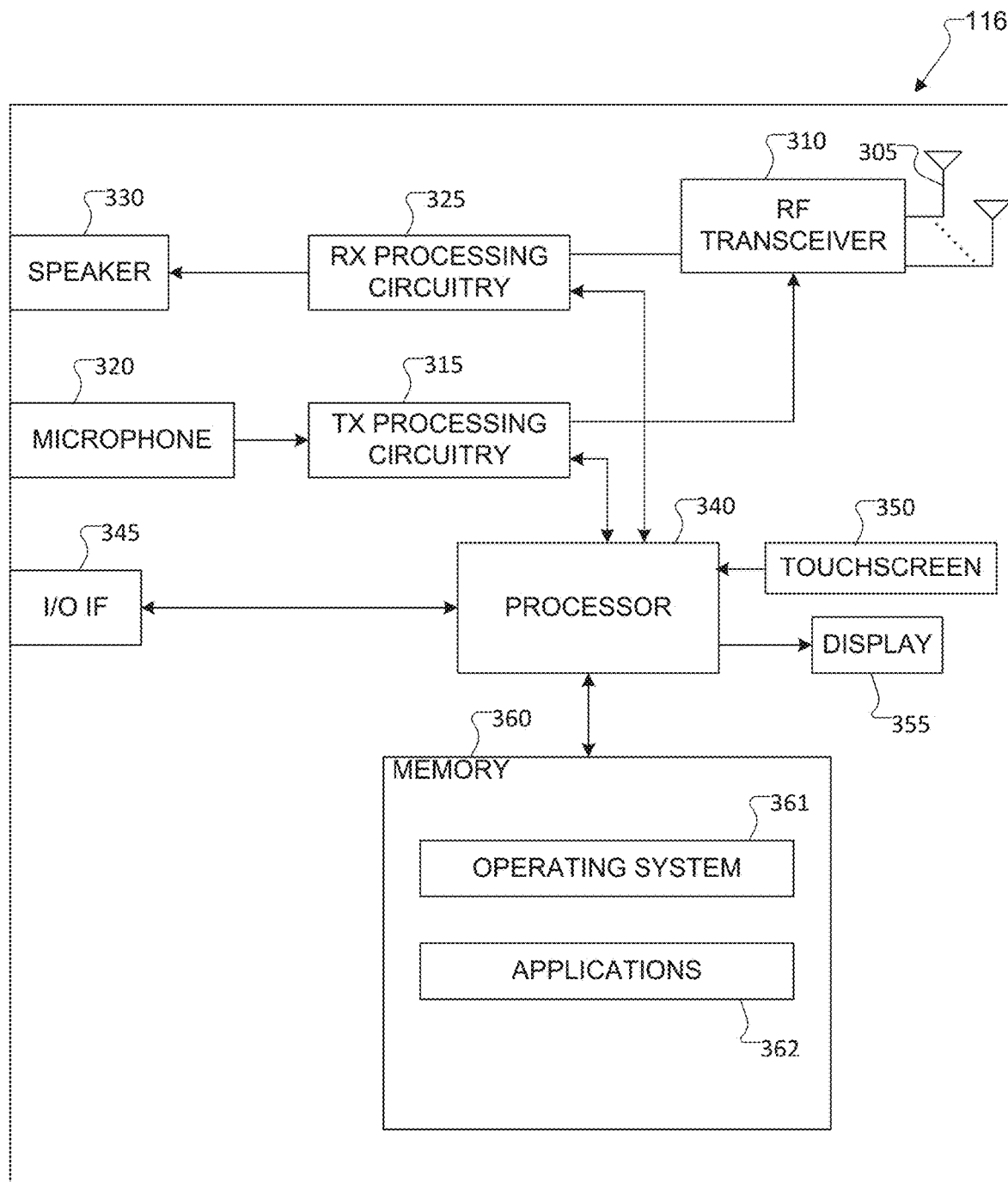
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for transmitting, via the transceiver, a configuration for at least one of a downlink (DL) reception or an uplink (UL) transmission, wherein the configuration comprises beam identifiers (IDs) and a slot and symbol configuration for respective ones of the one or more beam IDs and controlling the transceiver to perform, according to the configuration information, a DL operation or an UL operation.

As described in more detail below, one or more of the UEs 111-116 include circuitry, programming, or a combination thereof, for obtaining a configuration for at least one of a downlink (DL) reception or an uplink (UL) transmission, wherein the configuration comprises beam identifiers (IDs) and a slot and symbol configuration for respective ones of the one or more beam IDs and performing, according to the configuration information, a DL operation or an UL operation. In certain embodiments, and one or more of the gNBs 101-103 includes circuitry, programming, or a combination thereof, to facilitate communicating via a beam-specific operation in which one or more beam are configured according to a symbol and slot configuration.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions are configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support communication with aggregation of FDD cells and TDD cells.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
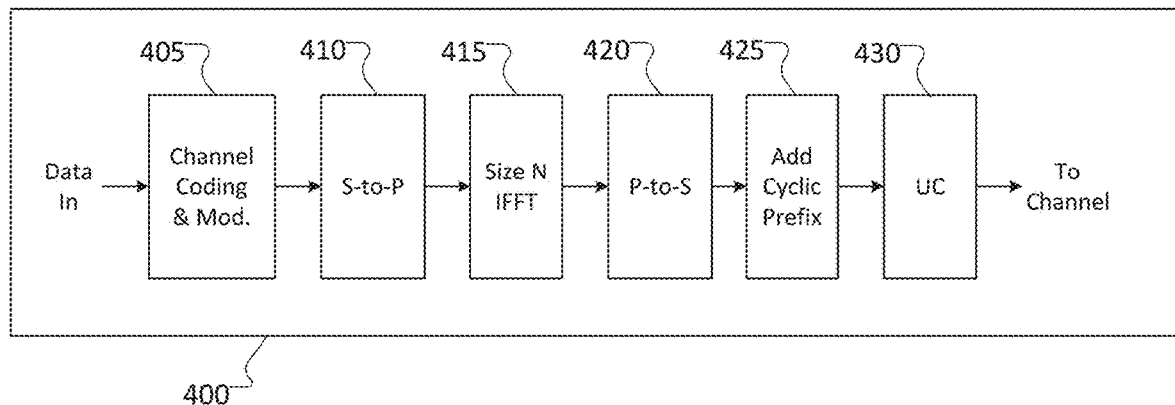
FIG. 4A illustrates a high-level diagram of an orthogonal frequency division multiple access transmit path according to embodiments of the present disclosure.
Figure 4B:
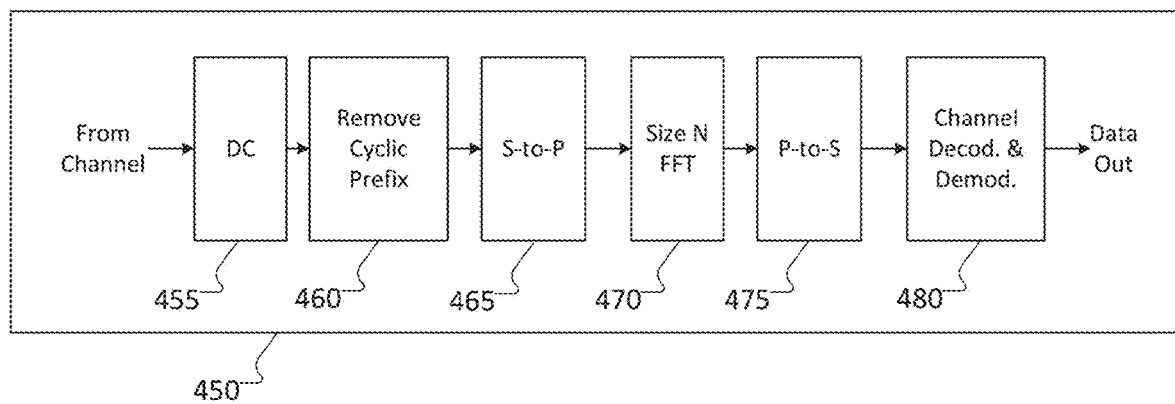
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information (CSI) reference signal (RS) (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (Acknowledgement (ACK)) or incorrect (negative acknowledgement (NACK)) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

As operating frequency bands in NR become higher, the UE is evolving to accommodate a plurality of antenna panels to enhance aspects of multi-beam operation such as coverage enhancement, beam failure event minimization, fast beam switching, etc. Depending on hardware architectures, each panel on the UE 116 can perform multi-beam operation in a decoupled manner so that it is possible for the UE 116 to be capable of simultaneously DL/UL operations via multiple beam links, each of which corresponds to sufficiently reliable channels to independently communicate with gNB 102. The previous NR specification only allows multiple panels on UE 116 to be used for simultaneous DL reception or single panel selection for UL transmission in TDD operation.

Figure 5:
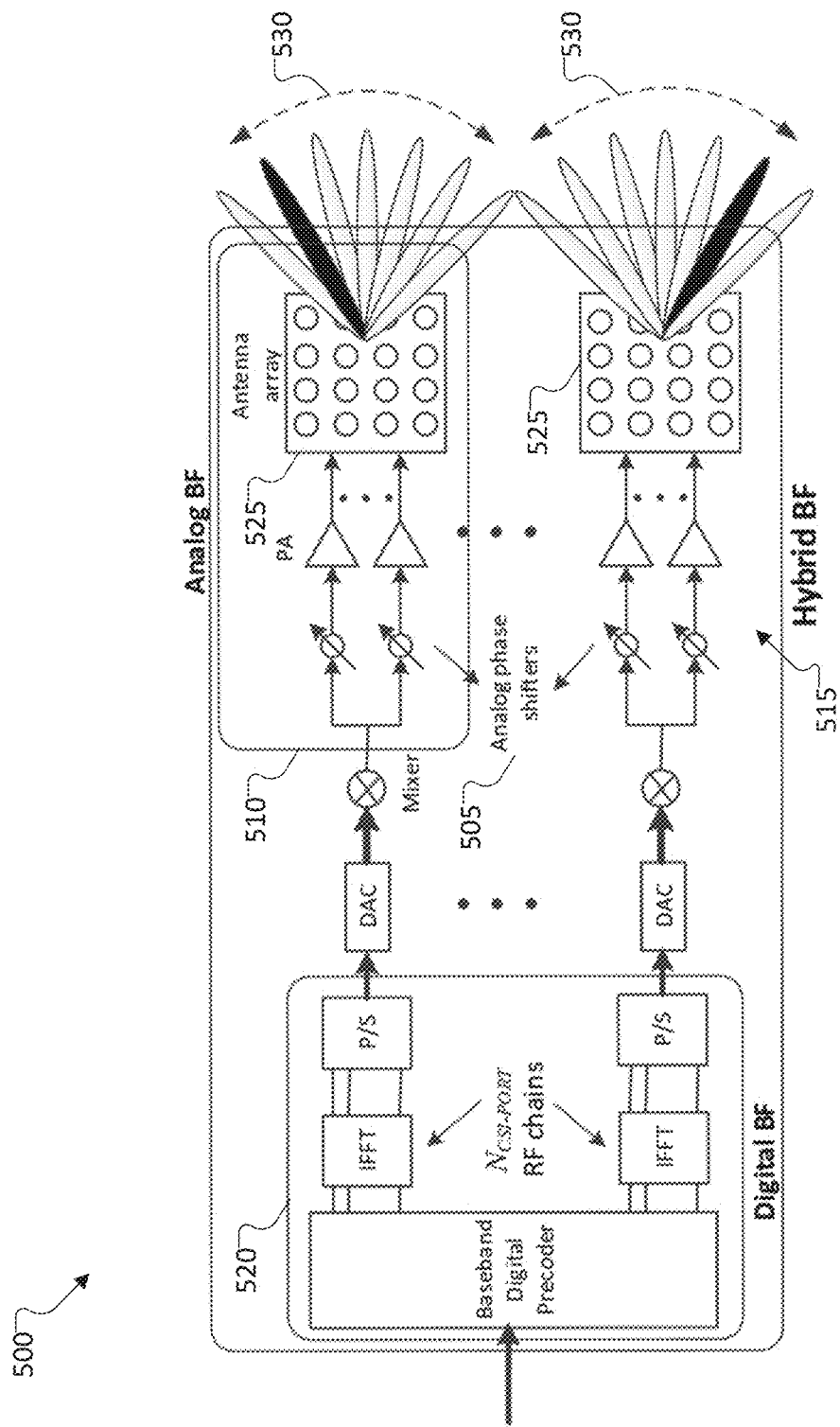
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

An antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A UE can be configured with a list of up to M transmission configuration indicator (TCI)-State configurations within the higher layer parameter PDSCH-Config to receive PDSCH in a serving cell where M depends on the UE capability maxNumberConfiguredTCIstatesPerCC. Each TCI-State contains parameters for configuring a QCL relationship between one or two downlink reference signals and the DMRS ports of the PDSCH, the DMRS port of a corresponding PDCCH, or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

The UE receives a MAC-CE activation command to map up to N, such as N=8, TCI states to the codepoints of the DCI field 'Transmission Configuration Indication'. When the HARQ-ACK information corresponding to the PDSCH carrying the MAC-CE activation command is transmitted in slot n, the indicated mapping between TCI states and codepoints of the DCI field 'Transmission Configuration Indication' should be applied after a MAC-CE application time, e.g., starting from the first slot that is after slot n+ $3N_{slot}^{subframe,\mu}$ where $N_{slot}^{subframe,\mu}$ is a number of slot per subframe for subcarrier spacing (SCS) configuration $\mu$.

As operating frequency bands in NR become higher, the UE is evolving to accommodate a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. By utilizing the capability of multiple panels, UE 116 is able to obtain a variety of diversity gains, which comes from dynamic selection of panel(s) with the best quality in terms of performance that systems want to optimize. For example, in 3GPP 5G NR Rel-17, new features to facilitate UL beam/panel selection for UEs equipped with multiple panels is being identified and specified under a unified transmission configuration indicator (TCI) framework, in order to mitigate UL coverage loss from several aspects such as maximum permissible exposure (MPE) issues on UE 116.

For example, a beam corresponds to a spatial transmission/reception filter that is used by the UE 116 and/or gNB 102. In one example, a beam can correspond to a spatial reception filter that is used by the UE 116 to receive a reference signal, such as an SS/physical broadcast channel (PBCH), synchronization signal block (SSB) and/or a CSI-RS and so on. In another example, a beam can correspond to a spatial transmission filter that is used by the UE 116 to transmit a reference signal, such as an UL sounding reference signal (SRS) and so on.

A beam training and measurement procedure can include, for example, a procedure wherein the gNB 102 configures the UE 116 with a set of reference signal (RS) resources, such as SSB resources and/or CSI-RS resources, as well as a configuration for report settings, such that the UE can report beam quality metric(s) measurement(s), such as Reference Signal Received Power (RSRP), Reference Signal Received Quality (RSRQ), Received Signal Strength Indicator (RSSI), Signal to Noise Ratio (SNR), Signal to Interference and Noise Ratio (SINR), and so on, each of which can be, e.g., a L-1 measurement or a filtered L-3 measurement. In one example, a UE 116 and/or a gNB 102 can transmit a reference signal (RS), such as a Synchronization Signal Block (SSB) or a CSI-RS or an SRS with a number of repetitions using a same spatial transmission filter in multiple occasions, so that the gNB 102 and/or UE 116, respectively, can receive the RS with different spatial reception filters, in order to facilitate beam sweeping and identification of a candidate/best beam based on a quality metric, such as L1/L3 RSRP or SINR. In one example, a selection of different spatial reception filters and/or quality metric and/or selection procedure can be per UE/gNB implementation.

A beam indication procedure can include, for example, a procedure wherein the gNB 102 can indicate to the UE 116 to transmit an uplink channel (and/or a second uplink signal) with a same spatial filter that was used to receive a (first) reference signal. In another example, the gNB 102 can indicate to the UE 116 to receive a downlink channel (and/or a second downlink signal) with a same spatial filter that was used to receive a (first) reference signal. Such indication can be, e.g., a DCI and/or MAC-CE, and/or RRC signaling.

In one example, an antenna panel or, simply a panel, can refer to an antenna array 525 or an antenna sub-array connected to one or multiple RF chains. In one example, a panel can be referred to as a transmission-reception entity (TRE), which can virtualize multiple physical panels into a single virtual panel, based on a transparent UE/gNB implementation, such as MIMO diversity scheme(s).

In previous NR configurations, such as up to release 17 (Rel-17 NR), multiple panels on the UE have been primarily used for simultaneous DL reception or single panel selection for UL transmission, respectively, which could correspond to some limited capability of what multiple panels on UE are able to do. Depending on hardware architectures, as an example, each panel on UE 116 is able to perform multi-beam operation in a decoupled manner so that the UE 116 is capable of simultaneously DL and UL operations via multiple beam links, each of which corresponds to sufficiently reliable channels to independently communicate with gNB 102. Here, the multiple beam links could be associated with one or multiple panels. For example, each of the beam links can have a different associated panel. Accordingly, it is expected that more features of the multi-beam operation to exploit the capability of UE having massive multiple panels will be specified to further improve performance of multi-beam UE in the future standard releases.

In addition to multi-beam operation, dynamic TDD is one of the key features of NR that allows that a slot, or one or more parts of a slot, is dynamically allocated to either uplink or downlink as part of the scheduler decision. Compared to LTE systems where the split between DL and UL resources in the time domain was semi-statically determined, dynamic TDD is able to provide more flexible/dynamic DL and UL resource allocation in parts of a slot or multiple slots, and thus it could improve several aspects such as load balancing between DL and UL resources, UL coverage, power saving issues, and so forth.

In NR, three different signaling mechanisms for dynamic TDD to provide information for UE on whether the resources are used for uplink or downlink transmission are: 1) dynamic signaling for the scheduled UE; 2) semi-static signaling using RRC; and 3) dynamic slot-format indication. Combinations of these three mechanisms are also supported. All of the signaling mechanisms for dynamic TDD can support "cell-specific" or "UE-specific" DL/UL resource allocation so far. For example, in the current NR standards, one or multiple UEs in a cell can be configured with a same DL/UL slot pattern which can contain DL, UL, and/or flexible slots. Then, for the flexible slots (if configured), DL/UL symbol patterns can be differently assigned for each of the UEs in a UE-specific manner. In certain examples, it has not been supported that DL/UL resources can be allocated in a "beam-specific" manner where different DL/UL resources can be allocated for each different beam link. This could limit the freedom associated with multi-beam links that are able to have different DL/UL directions, which could be independent, or partially independent, of each other.

Figure 6:
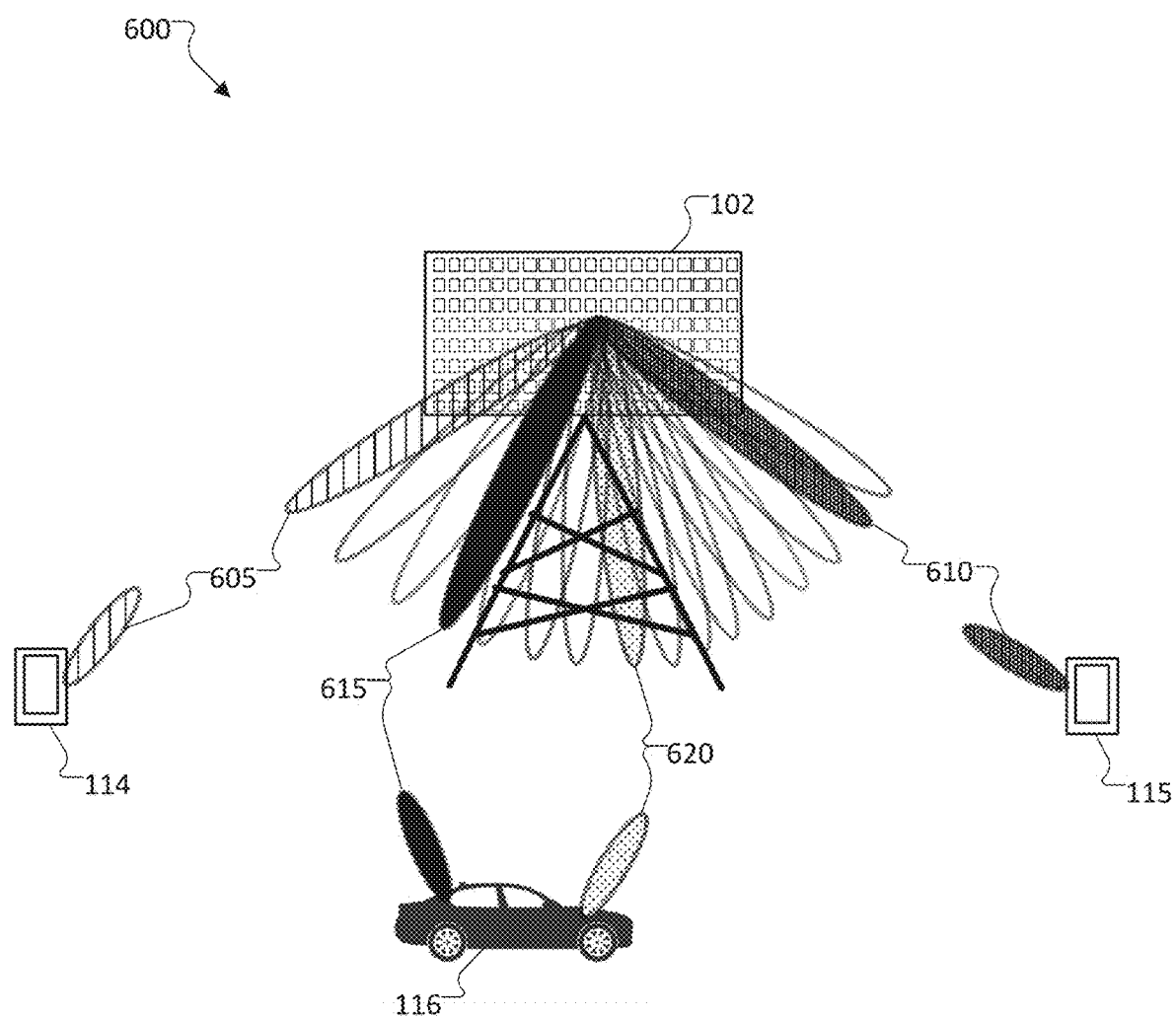
FIG. 6 illustrates a network diagram for communication to multiple terminals through different beams according to embodiments of the present disclosure.

FIG. 6 illustrates a network diagram for communication to multiple terminals through different beams according to embodiments of the present disclosure. The embodiment of the network 600 shown in FIG. 6 is for illustration only. Other embodiments could be used without departing from the scope of the present disclosure.

In the example shown in FIG. 6, UE 116 is depicted as a mobile vehicle while UE 114 and UE 115 are illustrated as mobile devices. Additionally, UE 116, UE 115, and UE 114 are associated with gNB 102, which is able to provide DL/UL configuration information that could be different for different beams. Other embodiments could be used without departing from the scope of the present disclosure.

The gNB 102 and UE 114 use beam pair 605 for DL/UL operation between them. Here, the term "beam pair" can refer to DL TX/RX beams, UL TX/RX beams, or DL TX/RX and UL TX/RX beams, which can be indicated by gNB 102, for example, during multi-beam operation. If beam correspondence holds, DL TX/RX beams can be the same as UL RX/TX beams. In this case, the "beam pair" can be determined by either DL TX/RX beams or UL RX/TX beams. If beam correspondence does not hold, DL TX/RX beams can be different from UL RX/TX beams, and thus the "beam pair" can include DL TX/RX and UL TX/RX beams for DL and UL operations, respectively, for no beam correspondence cases. In one example, a beam pair can refer to a spatial reception filter that is/was used by the respective UE to receive a downlink reference signal such as an SSB or a CSI-RS that is indicated by the gNB 102, whereas a spatial transmission filter used by the gNB 102 to transmit the downlink reference signal can be transparent to the respective UE. In another example, a beam pair can refer to a spatial transmission filter that is/was used by the respective UE to transmit an uplink reference signal, such as an SRS, that is indicated by the gNB 102, whereas a spatial reception filter used by the gNB 102 to receive the uplink reference signal can be transparent to the respective UE. The gNB 102 and UE 115 use beam pair 610 for DL/UL operation between them. In addition, gNB 102 and UE 116 use beam pair 615 and beam pair 620 for DL/UL operation between them. Here, DL/UL operation can be differently performed according to DL/UL configuration information associated with each of the beam pairs 605, 610, 615, and 620, respectively. Therefore, for UE 116 in this example, different DL/UL operation can be performed according to DL/UL configuration associated with each of the beam pairs 615 and 620, respectively. In the example depicted in FIG. 6, the maximum number of configured beam pairs for UE is two, but it can be more than two beams in other scenarios.

Figure 7:
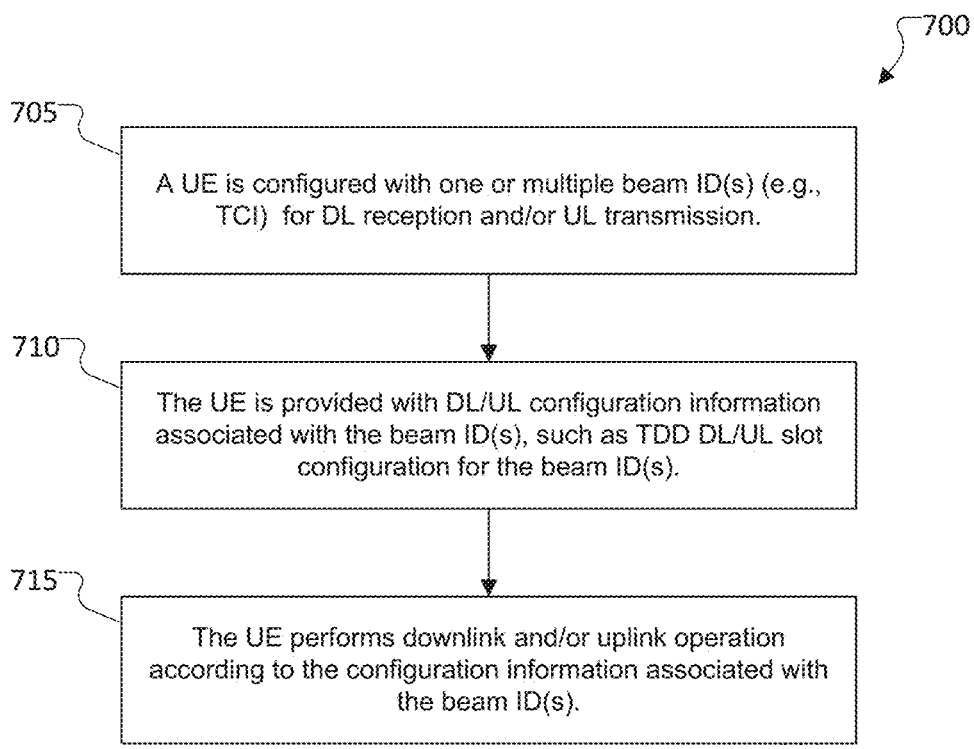
FIG. 7 illustrates a process for a beam-specific downlink/uplink operation for a terminal according to embodiments of the present disclosure.

FIG. 7 illustrates a process for a beam-specific downlink/uplink operation for a UE according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. Process 700 can be accomplished by, for example, UE 114, 115, and 116 in network 600.

At operation 705, a UE, such as UE 116, is configured with one or multiple beam ID(s) for DL reception and/or UL transmission. Although UE 116 is used in the example herein, any of UE 111-UE 115 could equally apply. Hereafter, the beam ID can be referred to as parameter(s) or element(s) that indicate DL beam, UL beam, or both, such as TCI for DL, SRI for UL in the current standards, or DL/UL TCI using a unified TCI framework (which is currently being discussed/developed in Rel-17), or any other variant for beam indication. For example, a unified TCI framework can contain indices each of which is corresponding to DL beam, UL beam, and/or panel ID. That is, in this example, an index in the unified TCI framework can be used for indicating beam ID, which specifies DL beam, UL beam, and/or panel ID. Note that the term "beam ID" is used for illustrative purposes and, therefore, not normative. In one example, a beam ID can be an ID corresponding to a DL/UL reference signal (RS) resource, such as an Synchronization Signal Block (SSB) resource ID (SSBRI), or a CSI-RS resource indicator (CRI), or an SRS Resource Indictor (SRI). In another example, a beam ID can additionally include an ID for a corresponding reference signal resource set, such as an CSI-RS resource set ID or an SRS resource set ID. In a further example, a beam ID can additionally include ID(s), such as physical cell ID (PCI) and/or global cell ID (GCI), and/or transmission-reception point (TRP) ID, and so on. The UE 116 can be configured with any default beam.

At operation 710, the UE 116 receives DL/UL configuration information associated with the configured beam ID(s). If multiple beam IDs are configured, the DL/UL configuration information associated with each of the configured beam IDs can be different, and therefore, the UE 116 can be provided with multiple DL/UL configuration information for the case of UE 116 configured with multiple beam IDs.

At operation 715, the UE performs a downlink and/or uplink operation. The UE 116 performs the downlink or uplink operation according to the configuration information associated with the configured beam ID(s).

Figure 8:
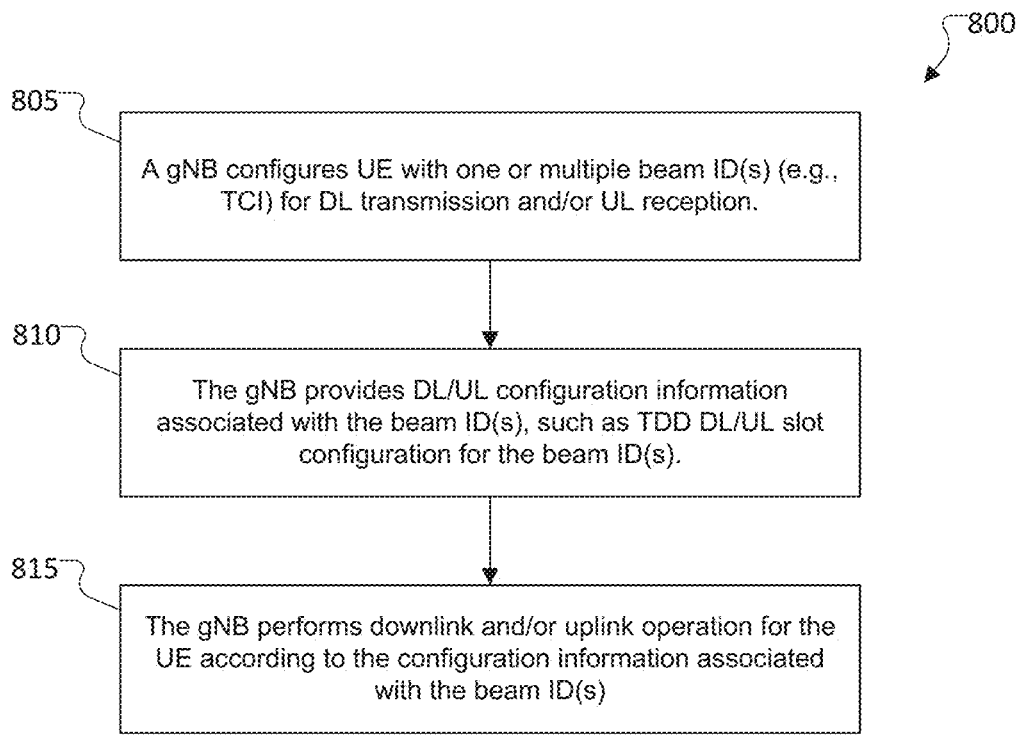
FIG. 8 illustrates a process for a beam-specific downlink/uplink operation for base station according to embodiments of the present disclosure.

FIG. 8 illustrates a process for a beam-specific downlink/uplink operation for a gNB according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a gNB. The beam-specific downlink/uplink operation can consist of three operations, as illustrated in FIG. 8. Process 800 can be accomplished by, for example, gNB 102 in network 600.

At operation 805, the gNB 102 configures UE, such as UE 116, with one or multiple beam ID(s) for DL transmission and/or UL reception. The gNB 102 can configure UE with any default beam.

At operation 810, the gNB 102 provides DL/UL configuration information associated with the configured beam ID(s). If gNB 102 configures UE 116 with multiple beam IDs, the DL/UL configuration information associated with each of the configured beam IDs for the UE 116 can be different. Therefore, the gNB 102 can provide multiple DL/UL configuration information for the case of the gNB 102 configuring the UE 116 with multiple beam IDs, such as, the case in which the gNB 102 configures UE 116 with beam pair 615 and 620 in network 600.

At operation 815, the gNB 102 performs downlink and/or uplink operations for UE 116. For example, the gNB 102 performs downlink operations or uplink operations according to the configuration information associated with the configured beam ID(s).

Figure 9:
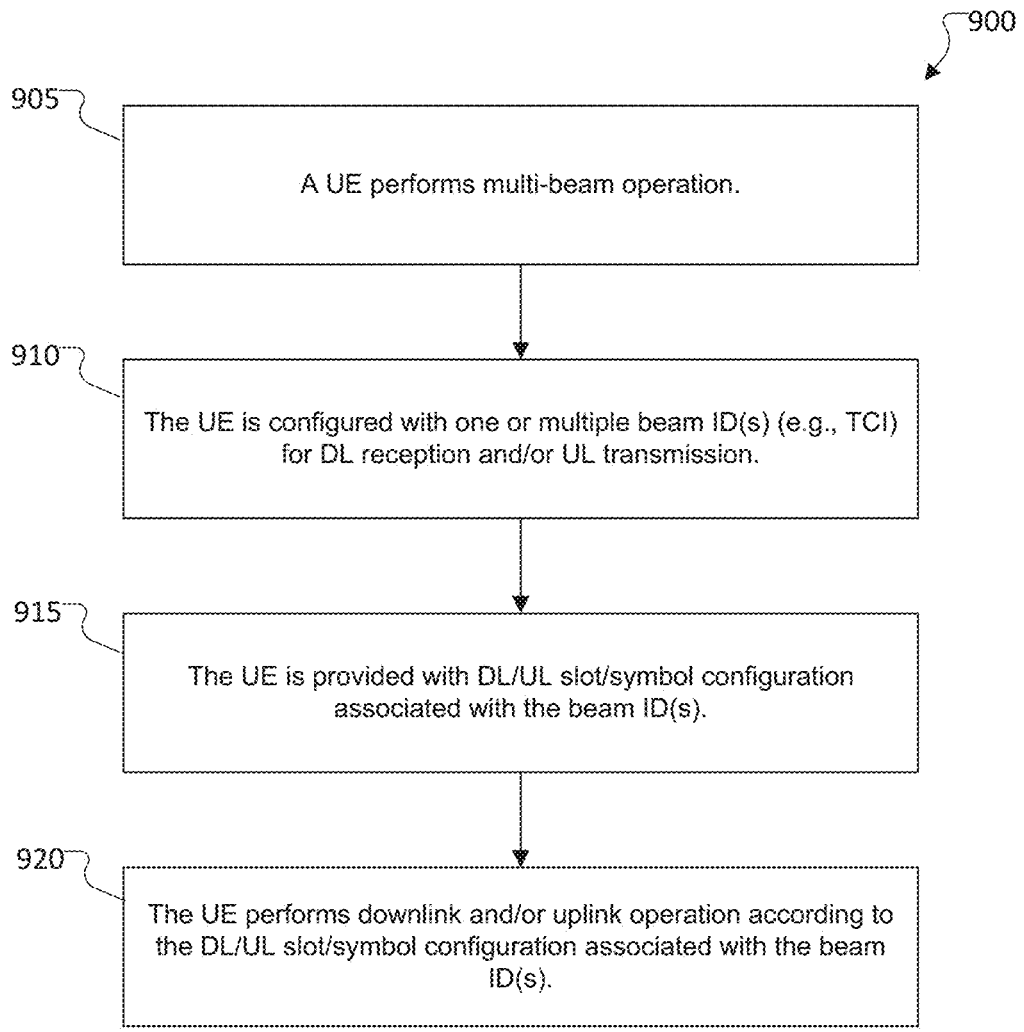
FIG. 9 illustrates a process for a beam-specific dynamic TDD operation for a terminal including multi-beam operation according to embodiments of the present disclosure.

FIG. 9 illustrates a process for a proposed beam-specific dynamic TDD operation for a UE including multi-beam operation according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. In certain embodiment for beam-specific downlink/uplink operation can consist of four operations, as illustrated in FIG. 9. Process 900 can be accomplished by, for example, UE 114, 115, and 116 in network 600.

At operation 905, a UE, such as UE 116, performs multi-beam operation. For example, the multi-beam process can be a process or a series of processes that can include beam sweeping, beam measurement, beam reporting, and/or beam indication. At operation 910, the UE is configured with one or multiple beam ID(s) for DL reception and/or UL transmission. At operation 915, the UE 116 receives DL/UL DL/UL slot/symbol configuration associated with the configured beam ID(s). If multiple beam IDs are configured, the DL/UL slot/symbol configuration associated with each of the configured beam IDs can be different, and therefore, UE 116 can be provided with multiple DL/UL slot/symbol configuration for the case when UE 116 is configured with multiple beam IDs. At operation 920, the UE 116 performs downlink and/or uplink operation according to the DL/UL slot/symbol configuration associated with the configured beam ID(s).

Figure 10:
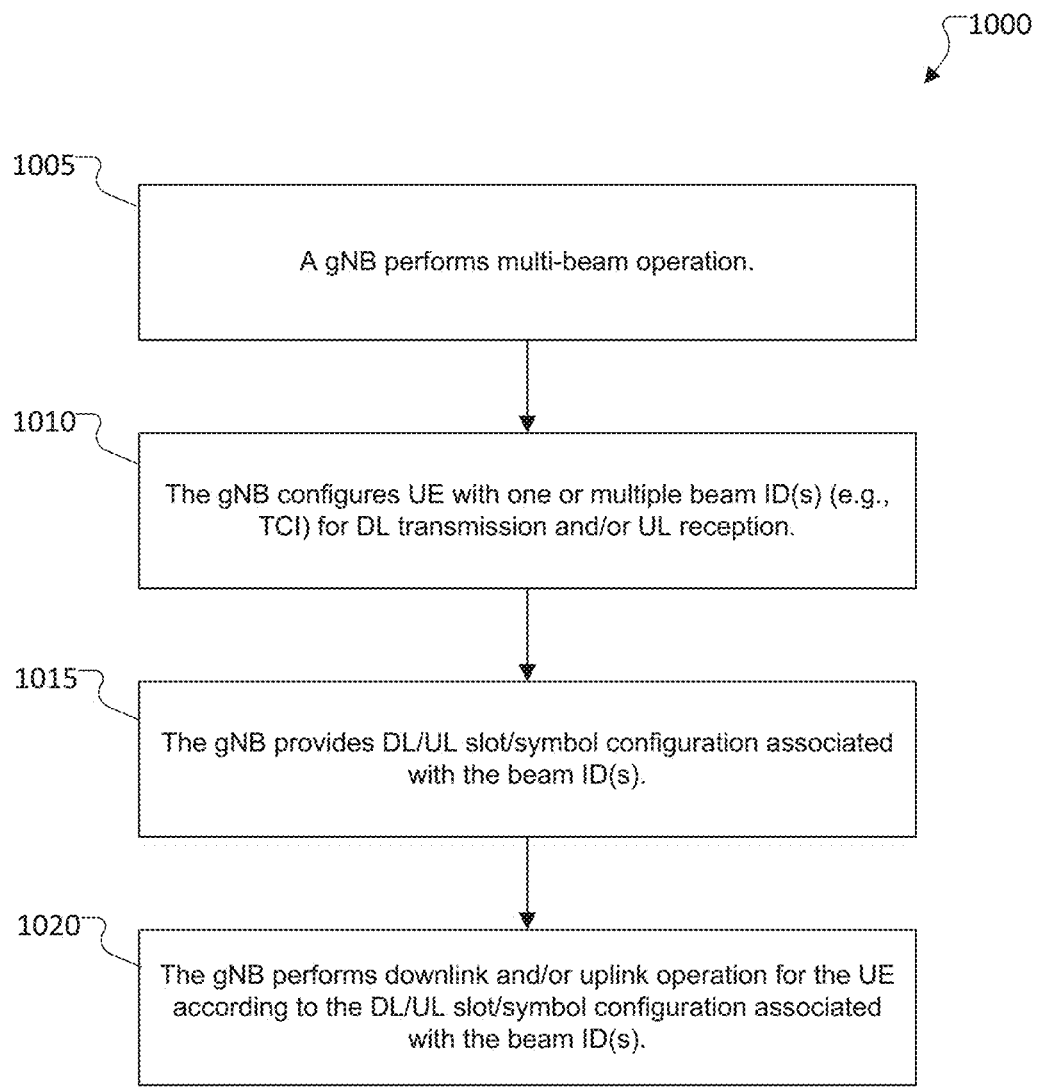
FIG. 10 illustrates a process for a beam-specific dynamic TDD operation for a base station including multi-beam operation according to embodiments of the present disclosure.

FIG. 10 illustrates a process for a proposed beam-specific dynamic TDD operation for a gNB including multi-beam operation according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a gNB. The beam-specific downlink/uplink operation can consist of four operations, as illustrated in FIG. 10. Process 1000 can be accomplished by, for example, gNB 102 in network 600.

At operation 1005, gNB 102 performs multi-beam operation. For example, the multi-beam operation can be a process or a series of processes that can include beam training, beam measurement, beam reporting, and/or beam indication. At operation 1010, the gNB 102 configures the UE 116 with one or multiple beam ID(s) for DL transmission and/or UL reception. At operation 1015, the gNB 102 provides DL/UL slot/symbol configuration associated with the configured beam ID(s) for UE 116. If gNB 102 configures the UE 116 with multiple beam IDs, the DL/UL slot/symbol configuration associated with each of the configured beam IDs for the UE 116 can be different. Therefore, the gNB 102 can provide multiple DL/UL slot/symbol configuration for the case when gNB 102 configures the UE 116 with multiple beam IDs, such as when the gNB 102 configures the UE 116 with beam pairs 615 and 620 in network 600. At operation 1020, the gNB 102 performs downlink and/or uplink operation for the UE 116 according to the DL/UL slot/symbol configuration associated with the configured beam ID(s).

Figure 11:
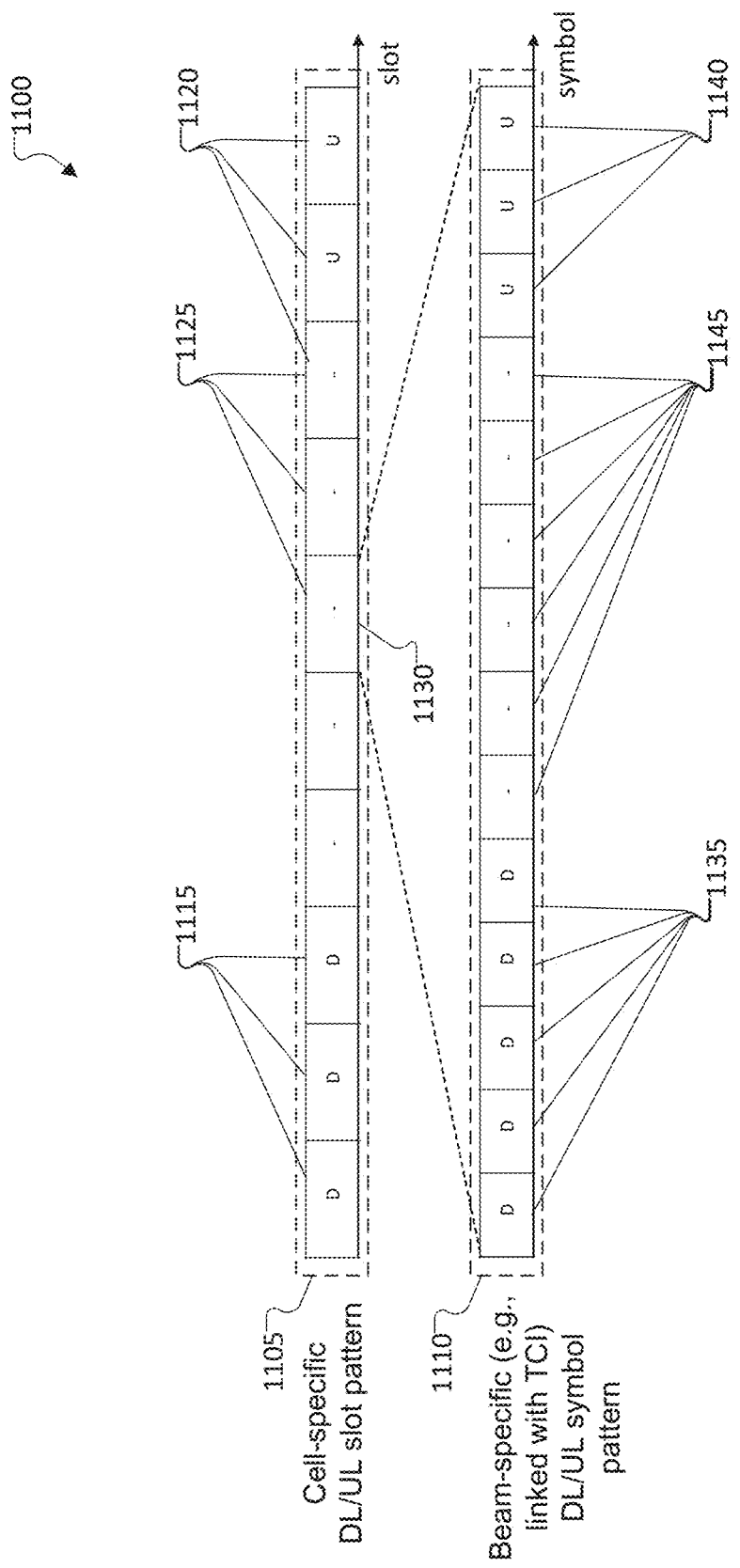
FIG. 11 illustrates an example DL/UL configuration for a beam-specific dynamic TDD operation according to embodiments of the present disclosure.

FIG. 11 illustrates an example DL/UL configuration for a beam-specific dynamic TDD operation according to embodiments of the present disclosure. The embodiment of the DL/UL configuration 1100 shown in FIG. 11 is for illustration only. Other embodiments could be used without departing from the scope of the present disclosure.

In certain embodiments, the UE 116 is provided with DL/UL symbol pattern(s) associated with the configured beam ID(s) within a flexible slot that is neither specifically assigned as DL nor UL, such as illustrated in operations 710 in FIG. 7 and operation 10 in FIG. 9. In certain embodiments, the gNB 102 provides UE 116 with DL/UL symbol pattern(s) associated with the configured beam ID(s) within a flexible slot that is neither specifically assigned as DL nor UL, such as illustration in operation 810 in FIG. 8 and operation 1015 in FIG. 10.

FIG. 11 depicts an example in which the UE 116 either obtains or is provided by the gNB 102, the DL/UL symbol pattern(s) associated with the configured beam ID(s) within a flexible slot that is neither specifically assigned as DL nor UL. As shown in DL/UL slot/symbol configuration 1100, the UE 116 can be provided with DL/UL slot pattern 1105, which can be provided by gNB 102. For example, the DL/UL slot pattern 1105 can be provided using the parameter TDD-UL-DL-ConfigCommon in TS 38.213/38.331 that is an element to configure a cell-specific or a UE-specific DL/UL TDD configuration. Slots can be assigned as DL, UL, and flexible slots. For example, slots can be assigned as DL slots 1115, UL slots 1120, and flexible slots 1125. For each of the flexible slots 1125, the UE 116 can be provided, or the gNB 102 can provide UE 116, with DL/UL symbol pattern associated with the configured beam ID. For example, within flexible slot 1130, symbols can be assigned as DL, UL, and flexible symbols, respectively. That is, symbols within flexible slot 1130 can be assigned as DL symbols 1135, UL symbols 1140, and flexible symbols 1145. In certain embodiments, the DL/UL symbol pattern can be different per the configured beam ID. Therefore, multiple DL/UL symbol patterns can be provided within the same flexible slot 1125 when the UE 116 is configured with multiple beam IDs. The order of the assigning DL slots/symbols, UL slots/symbols, and flexible slots/symbols shown in FIG. 11 is for illustration only and other embodiments in which DL slots/symbols, UL slots/symbols, and flexible slots/symbols are assigned differently can be used without departing from the scope of the present disclosure.

In one example, DL/UL symbol pattern 1110 associated with the configured beam ID can be provided by using variants of the parameter TDD-UL-DL-ConfigDedicated in TS 38.213/38.331. As a specific example, DL/UL symbol pattern 1110 with the configured beam ID can be provided by TDD-UL-DL-SlotConfig-TciState in the example below that shows several updated information elements (IEs). In the example below, the tci-StateId (underlined below) in TDD-UL-DL-SlotConfig-TciState is used as an example to indicate the configured beam ID, for the sake of simplicity, assuming a unified TCI framework that includes DL/UL TX/RX beams, and/or panel IDs is developed; but other beam indicators can be used. In the example shown in FIG. 11, DL/UL symbol patterns associated with the configured beam ID for several slots, such as flexible slots 1125, can be provided using TDD-UL-DL-ConfigDedicated-TciState. In addition, in the example of FIG. 11, DL/UL symbol patterns associated with each of multiple configured beam IDs for several slots, such as flexible slots 1125, can be provided using TDD-UL-DL-ConfigDedicated. Here, the number of multiple configured beam IDs can be provided using maxNrofTDD-UL-DL-ConfigDedicated-TciState. An example algorithm can be:

```
TDD-UL-DL-ConfigDedicated    ::=                              SEQUENCE   {
    slotSpecificConfigurationsToAddModList    SEQUENCE (SIZE (1..maxNrofTDD-
UL-DL-ConfigDedicated-TciState)) OF TDD-UL-DL-ConfigDedicated-TciState
OPTIONAL, -- Need N
    slotSpecificConfigurationsToReleaseList   SEQUENCE (SIZE (1..maxNrofTDD-UL-
DL-ConfigDedicated-TciState)) OF TDD-UL-DL-TciStateindex    OPTIONAL, -- Need
N
    ...
}
maxNrofTDD-UL-DL-ConfigDedicated-TciState ::= INTEGER
(1..maxNrofTCI-States)
TDD-UL-DL-TciStateIndex ::=                      INTEGER (0.. maxNrofTDD-UL-DL-
ConfigDedicated-1)
    TDD-UL-DL-ConfigDedicated-TciState   ::=                     SEQUENCE {
        slotSpecificConfigurationsTciStateToAddModList           SEQUENCE (SIZE
(1..maxNrofSlots)) OF TDD-UL-DL-SlotConfig-TciState      OPTIONAL, -- Need N
        slotSpecificConfigurationsTciStateToReleaseList          SEQUENCE (SIZE
(1..maxNrofSlots)) OF TDD-UL-DL-SlotIndex                OPTIONAL, -- Need N
        ...
}
TDD-UL-DL-SlotConfig-TciState   ::=                                SEQUENCE {
    slotIndex TDD-UL-DL-SlotIndex,
    symbols                                                        CHOICE {
        allDownlink NULL,
        allUplink NULL,
        explicit                                                   SEQUENCE {
            nrofDownlinkSymbols                      INTEGER (1..maxNrofSymbols-1)
OPTIONAL, -- Need S
            nrofUplinkSymbols                        INTEGER (1..maxNrofSymbols-1)
OPTIONAL -- Need S
        }
    }
        tci-StateId                                                TCI-StateId
}
TDD-UL-DL-SlotIndex ::=    INTEGER (0..maxNrofSlots-1)
```

For example, if maxNrofTDD-UL-DL-ConfigDedicated-TciState is configured with 3, three different DL/UL symbol patterns can be configured and each of the symbol patterns is associated with the corresponding beam ID. An example of three symbol patterns is shown in Table 1.

TABLE 1

| DL/UL symbol pattern assignment in a flexible slot for each beam ID, e.g., TCI | | | | | | | | | | | | | |
|---|---|---|---|---|---|---|---|---|---|---|---|---|---|
| TCI-State 1 | D | D | D | D | F | F | F | F | U | U | U | U | U | U |
| TCI-State 2 | U | U | U | U | U | U | U | U | D | D | D | D | D | D |
| TCI-State 3 | D | U | D | U | D | U | D | U | D | U | D | U | D | U |

The UE 116, or the gNB 102, performs downlink and/or uplink operation according to the configuration information associated with the configured beam ID(s), which can correspond to operation 715, 815, 920, or 1020. For example, for the above case, the UE 116, or the gNB 102, receives/transmits data according to the provided DL/UL slot/symbol pattern(s) associated with the configured beam ID(s). In other words, the UE 116, or the gNB 102, receives/transmits data using the DL RX and/or UL TX beams, or using the DL TX and/or UL RX beams, that are specified by the configured beam ID(s), in synch/accordance with the provided DL/UL slot/symbol pattern(s) associated with the configured beam ID(s).

In one example, if a UE is operating with a first beam/spatial filter/reference signal (e.g., a CSI-RS) that has no associated configuration information (such as UL/DL TDD pattern), in one option, the UE can perform downlink and/or uplink operation according to the configuration information (such as UL/DL TDD pattern) associated with a second beam/spatial filter/reference signal (e.g., an SSB) which has a QCL relationship assumption with the first beam/spatial filter/reference signal. In another option, the UE can perform downlink and/or uplink operation according to a predefined rule, or based on a fixed and/or default configuration information (such as UL/DL TDD pattern), e.g., with a configuration information (such as an UL/DL TDD pattern) associated with a fixed/default beam, or a reference configuration information (such as a reference UL/DL TDD pattern).

Figure 12:
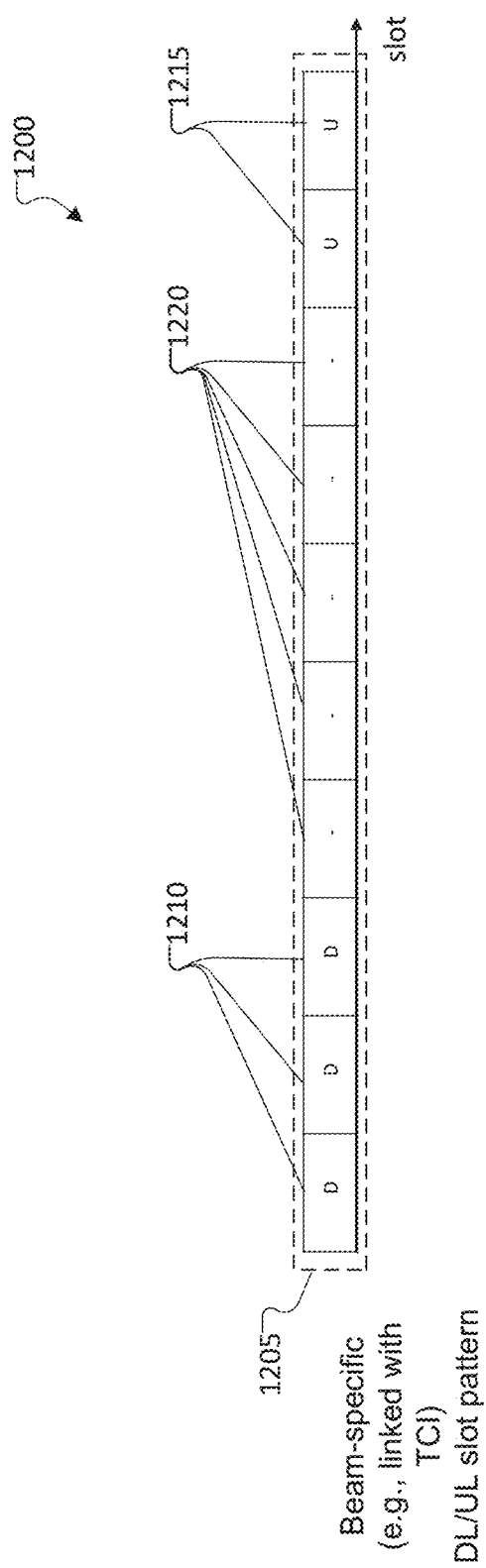
FIG. 12 illustrates an example DL/UL configuration for a beam-specific dynamic TDD operation according to embodiments of the present disclosure.

FIG. 12 illustrates an example DL/UL configuration for a beam-specific dynamic TDD operation according to embodiments of the present disclosure. The embodiment of the DL/UL configuration 1200 shown in FIG. 12 is for illustration only. Other embodiments could be used without departing from the scope of the present disclosure.

In certain embodiments, the UE 116 can be provided, or the gNB 102 can provide UE 116, with DL/UL slot pattern associated with the configured beam ID, which can be performed in operation 710, 810, 915, or 1015. FIG. 12 illustrates an example of the UE 116 obtaining, or the gNB 102 providing, the DL/UL slot pattern associated with the configured beam ID. As shown in DL/UL slot configuration 1200, the UE can be provided with DL/UL slot pattern 1205 associated with the configured beam ID, which can be provided by gNB 102, for example, using variants of the parameter TDD-UL-DL-ConfigCommon.

In certain embodiments, slots can be assigned as DL, UL, and flexible slots, respectively. For example, slots can be assigned as DL slots 1210, UL slots 1215, and flexible slots 1220. For each of the flexible slots 1220, the UE 116 can be provided, or the gNB 102 can provide UE 116, with DL/UL symbol pattern associated with the configured beam ID(s). Here, DL/UL slot pattern 1205 can be different per the configured beam ID, so multiple DL/UL slot patterns can be provided when the UE 116 is configured with multiple beam IDs. The order of the assigning DL slots, UL slots, and flexible slots shown in FIG. 12 is for illustration only and other embodiments in which DL slots, UL slots, and flexible slots are assigned differently can be used without departing from the scope of the present disclosure.

In one example, DL/UL slot pattern 1205 associated with the configured beam ID can be provided by gNB 102, for example, using variants of the parameter TDD-UL-DL-ConfigCommon in TS 38.213/38.331. Note that although this example is given based on the parameter TDD-UL-DL-ConfigCommon, embodiments of the present disclosure are not restricted to the cell-specific case.

Specifically, in the example below, DL/UL slot pattern 1205 with the configured beam ID can be provided using TDD-UL-DL-ConfigCommon-TciState. In the example shown in FIG. 12, the tci-StateId in TDD-UL-DL-ConfigCommon-TciState is used as an example for the configured beam ID assuming a unified TCI framework that includes DL/UL TX/RX beams, and/or panel IDs is developed, but other beam indicators can be used. In the example below, DL/UL slot pattern 1205 associated with each of multiple selected beam IDs can be provided using TDD-UL-DL-ConfigCommon. In the example shown in FIG. 12, the number of multiple configured beam IDs can be provided using maxNrofTDD-UL-DL-ConfigCommon-TciState. An example algorithm can be:

```
TDD-UL-DL-ConfigCommon ::=                              SEQUENCE {
    commonConfigurationsTciToAddModList   SEQUENCE (SIZE (1..maxNrofTDD-
UL-DL-ConfigCommon-TciState)) OF TDD-UL-DL-ConfigCommon-TciState
OPTIONAL, -- Need N
    commonConfigurationsTciToReleaseList SEQUENCE (SIZE (1..maxNrofTDD-UL-
DL-ConfigCommon-TciState)) OF TDD-UL-DL-TciStateIndex   OPTIONAL, -- Need
N
    ...
}
maxNrofTDD-UL-DL-ConfigCommon-TciState ::= INTEGER
(1..maxNrofTCI-States)
TDD-UL-DL-TciStateIndex ::=              INTEGER (0.. maxNrofTDD-UL-DL-
ConfigConfigCommon−1)
```

```
TDD-UL-DL-ConfigCommon-TciState ::=                SEQUENCE {
    referenceSubcarrierSpacing SubcarrierSpacing,
    pattern1 TDD-UL-DL-Pattern-TciState,
    pattern2 TDD-UL-DL-Pattern-TciState
OPTIONAL, -- Need R
    ...
}
TDD-UL-DL-Pattern-TciState ::=                     SEQUENCE {
    dl-UL-TransmissionPeriodicity     ENUMERATED {ms0p5, ms0p625, ms1, ms1p25,
ms2, ms2p5, ms5, ms10},
    nrofDownlinkSlots                           INTEGER (0..maxNrofSlots),
    nrofDownlinkSymbols                         INTEGER (0..maxNrofSymbols-1),
    nrofUplinkSlots                             INTEGER (0..maxNrofSlots),
    nrofUplinkSymbols                           INTEGER (0..maxNrofSymbols-1),
        tci-StateId                                    TCI-StateId
    ...,
    [[
    dl-UL-TransmissionPeriodicity-v1530    ENUMERATED   {ms3,  ms4}
OPTIONAL -- Need R
    ]]
}
-- TAG-TDD-UL-DL-CONFIGCOMMON-STOP
-- ASN1STOP
```

For example, if maxNrofTDD-UL-DL-ConfigDedicated-TciState is configured with a "3", three different DL/UL slot/symbol patterns can be configured and each of the slot/symbol patterns is associated with the corresponding beam ID. An example of three slot/symbol patterns is shown in Table 2.

TABLE 2

An example of DL/UL slot pattern assignment for each beam ID, e.g., TCI

| TCI-State 1 | D | D | D | F | F | U | U | U | U | U |
|---|---|---|---|---|---|---|---|---|---|---|
| TCI-State 2 | D | U | D | U | D | U | D | U | D | U |
| TCI-State 3 | U | U | U | U | U | U | D | D | D | D |

In one example, "TCI" or "TCIstate" (and corresponding elements) in the above RRC information element can refer to a cell-specific reference signal such as an SS/PBCH block (SSB) for configuration of a common (cell-specific) UL/DL TDD pattern, so that "TCIStateID" can be replaced, e.g., with "SSBRI" and so on. In another example, "TCI" or "TCIstate" (and corresponding elements) in the above RRC information element can refer to a common DL RS that is commonly configured to all UEs. Such common configuration can be explicitly indicated to all UEs or can be achieved implicitly by gNB implementation.

The UE 116 or the gNB 102 performs downlink and/or uplink operation according to the configuration information associated with the configured beam ID(s), which can be performed in operation 715, 815, 920, or 1020. For example, the UE 116 or the gNB 102 receives/transmits data according to the provided DL/UL slot/symbol pattern(s) 1205 associated with the configured beam ID(s). In other words, the UE 116, or the gNB 102, receives/transmits data using the DL RX and/or UL TX beams, or using the DL TX and/or UL RX beams, that are specified by the configured beam ID(s), in synch/accordance with the provided DL/UL slot/symbol pattern(s) 1205 associated with the configured beam ID(s).

In one example, if the UE 116 is operating with a first beam/spatial filter/reference signal (e.g., a CSI-RS) that has no associated configuration information (such as UL/DL TDD slot pattern 1205), in one option, the UE 116 performs downlink and/or uplink operation according to the configuration information (such as UL/DL TDD pattern) associated with a second beam/spatial filter/reference signal (e.g., an SSB) which has a QCL relationship assumption with the first beam/spatial filter/reference signal. In another option, the UE 116 performs downlink and/or uplink operation according to a predefined rule, or based on a fixed and/or default configuration information (such as UL/DL TDD pattern), such as with a configuration information (such as an UL/DL TDD pattern) associated with a fixed/default beam, or a reference configuration information (such as a reference UL/DL TDD pattern).

In certain embodiments, the gNB 102 configures a number of two or more cell-specific TDD DL/UL patterns, e.g., TDD-UL-DL-ConfigCommon, that applies to all UEs within the serving cell, wherein each TDD-UL-DL-ConfigCommon is associated with a SS/PBCH block (SSB) configured for the cell. When UE 116 operates with an SSB and/or another reference signal (RS) which is QCL with the SSB (e.g., QCL Type-D), then the UE 116 applies the corresponding TDD DL/UL pattern, TDD-UL-DL-ConfigCommon. In such case, the UE 116 operates with any UE-specific TDD DL/UL pattern (including any beam-UE-specific TDD-UL-DL-ConfigDedicated-TCIstate, which is shown in the RRC example above) based on the corresponding TDD-UL-DL-ConfigCommon as a reference cell-specific TDD DL/UL pattern.

In certain embodiments, the UE 116 can be dynamically triggered, or the gNB 102 can dynamically trigger UE 116, e.g., in an aperiodic or semi-persistent manner, via lower-layer control signaling (L1 or L2, i.e., DCI or MAC CE) to be configured with DL/UL directions associated with the configured beam ID(s). For example, gNB 102 can trigger the UE 116 to change the current DL/UL direction via DCI or MAC CE. Here, the required information to trigger via DCI or MAC CE can contain a pair of (beam ID, a DL/UL direction change indicator). A DL/UL direction change indicator can be a single-bit indicator. Indirect association would be possible to use for DL/UL direction change.

In one example, a beam-specific UL/DL TDD pattern that configures DL/UL directions associated with a set of one or multiple configured beam ID(s) can be used in a group-common signaling, such as a DCI format 2_0 for slot format indication. For example, a group-common DCI format 2_0 can indicate a group of UL/DL TDD patterns, wherein each pattern within the group corresponds to an UL/DL TDD pattern associated with a beam ID. Once the UE receives and decodes such indication in a DCI format 2_0, the UE applies, from the group of indicated patterns, a UL/DL TDD pattern which is associated with the operating beam ID.
Procedure for Beam Failure Event Reduction.

For a UE configured with different TDD slot/symbol patterns each of which is associated with a configured beam ID, beam failure events can be prevented by a mechanism that allows the UE to report the qualities of other beam links via another beam link for the gNB to notice the status of the beam links in advance before beam failure recovery (BFR) process potentially happens for the beam links. In one example, UE 116 can be configured to report RSRP, RSRQ, SINR of a DL RS (e.g., beam failure detection resources) for beam links via another beam link. In another example, UE 116 can be configured with scheduling request ID for BFR, which can be similarly defined as the one in Clause 9.2.4 of TS. 38.213, and thus the UE 116 can perform PUCCH transmission using beam links other than the beam-failure detected beam links whose qualities become smaller than a threshold, to request BFR process for the BFR detected beam links.

Figure 13:
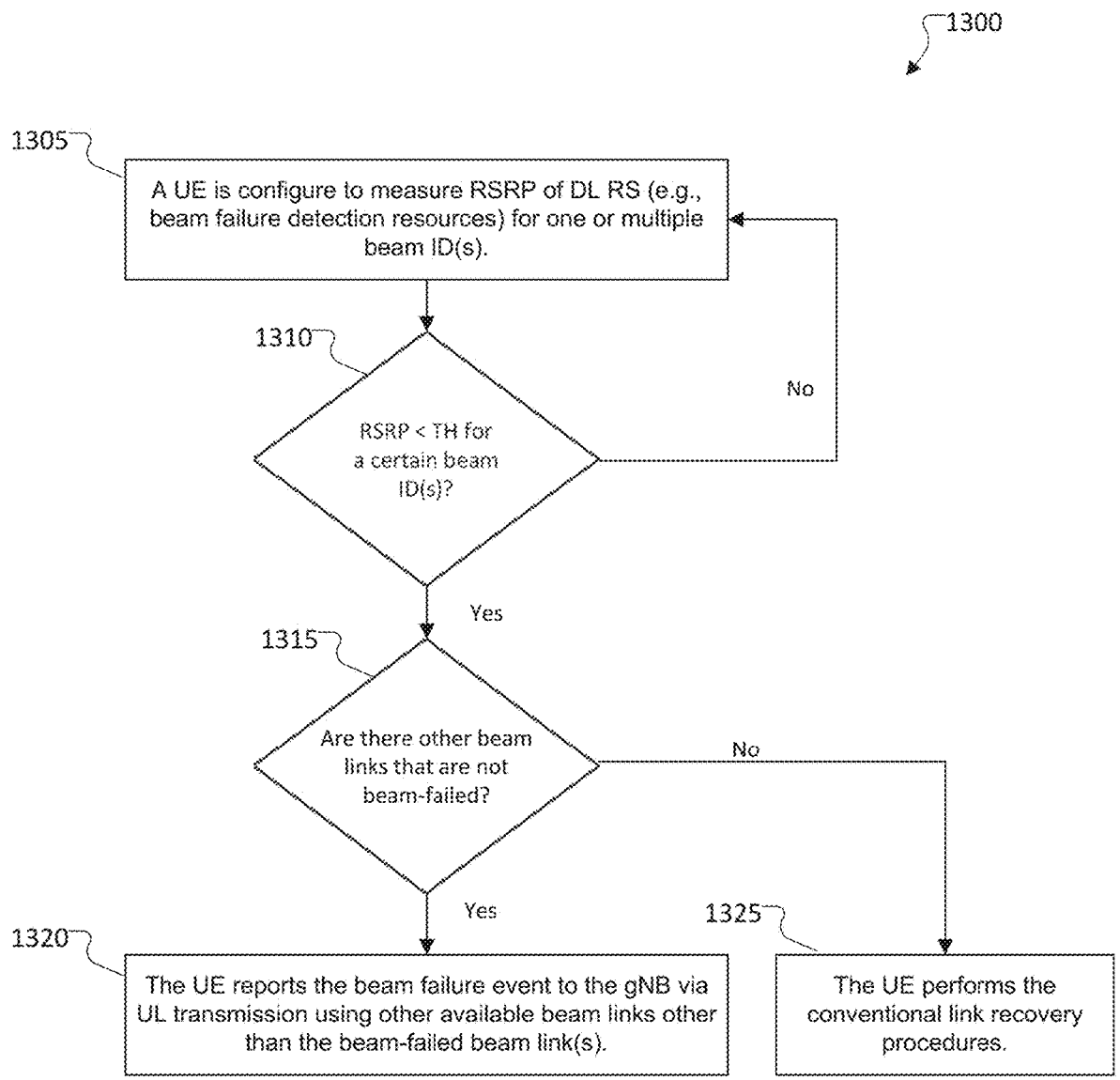
FIG. 13 illustrates a process for preventing a beam failure event in the beam-specific dynamic TDD operation according to embodiments of the present disclosure.

FIG. 13 illustrates a process for preventing a beam failure event in the beam-specific dynamic TDD operation according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE. In certain embodiment for beam-specific downlink/uplink operation can consist of four operations, as illustrated in FIG. 13. Process 1300 can be accomplished by, for example, UE 114, 115, and 116 in network 600.

At operation 1305, UE 116 is configured to measure RSRP of DL RS for one or multiple IDs. The UE 116 measures the RSRP of a DL RS, such as the failureDetectionResources in Clause 6 of TS. 38.213, for one or multiple beam ID(s) to detect whether beam failure events happen or not.

At operation 1310, the UE 116 checks whether the measured RSRP(s) for each of the configured beam ID(s) is smaller than a configured threshold value or not. Here, the threshold value can be configured by using, for example, rsrp-ThresholdSSBBFR, and/or powerControlOffsetSS, as described in Clause 6 of TS 38.213. Alternatively, the threshold can be configured by a default threshold value. If the UE 116 determines that the RSRP is greater than or equal to (≥) the threshold, the UE 116 returns to operation 1305 to again measure the RSRP of DL RS for one or multiple IDs. If the UE 116 determines that the RSRP is less than (<) the threshold, the UE 116 proceeds to operation 1315.

At operation 1315, the UE checks for beam failures. That is, the UE 116 checks whether there are other available beam links that are not beam-failed or not. Here, "beam links that are not beam-failed" can refer to the case that the measured RSRPs corresponding to the beam links are not smaller than the configure threshold value. If the UE 116 determines that there are no beam-failed beam links, the UE 116 proceeds to operation 1320. If the UE 116 determines that there are beam-failed beam links, the UE 116 proceeds to operation 1325.

At operation 1320, the UE 116 reports the beam failure event for the beam ID(s) with the measured RSRP smaller than the threshold, which is identified at operation 1310, to the gNB 102 via UL transmission using another available beam link(s). Here, the UE 116 can report via, for example, a scheduling request like PUCCH transmission using the available beam link(s) that is not beam-failed.

At operation 1325, the UE 116 performs the conventional link recover procedures if it is identified at operation 1315 that there are no available beam links. The conventional link recover procedures can be the same as, or similar to, those in Clause 6 of TS.38.214.

Component for Self-Interference Measurement

For a UE to be configured with different TDD slot/symbol patterns each of which is associated with a configured beam ID, measuring self-interference at the UE, which is the interference measured at DL receiving panel(s) by the signal transmitted from UL transmitting panel(s), can be a crucial criterion to determine the capability of multiple beam-specific DL and UL slot/symbol configurations at the UE. In certain embodiments, for UE to measure self-interference across different panels with different beams, the UE can be configured to transmit UL RS (e.g., SRS) at a panel(s) with a UL beam(s) and to measure the UL RS (i.e., self-interference) at another panel(s) with a DL beam(s), e.g., at a same time-and-frequency resource, and can also be configured to report the corresponding interference quantity. In this configuration, gNB 102 can collect the interference quantity with respect to the relationship between DL and UL panels with DL and UL beams, and can allocate multiple DL and UL slot/symbol configurations each of which is associated with a different beam ID, in a manner that self-interference can be minimized.

In one example, a gNB 102 can configure UE 116 to send UL RS at a panel with a UL beam (i.e., corresponding to a beam ID) and to measure the UL RS (self-interference) at another panel with a DL beam (i.e., corresponding to another beam ID), and configure the UE 116 to report the corresponding self-interference in a subsequent UL transmission. The interval for subsequent UL transmission can be configured or fixed. In one example, the subsequent UL transmission can be trigger-based, that is, the UL transmission performs only when an event is satisfied.

In one example, the gNB 102 can configure UE 116 to periodically send UL RS at a panel with a UL beam (i.e., corresponding to a beam ID) for a time period and to measure the UL RS (self-interference) by sweeping all (or part) of DL beams at the other panels one-by-one, and configure UE 116 to report all or part of the corresponding self-interferences in subsequent UL transmissions. In one example, only one representative self-interference value (e.g., maximum self-interference value among the measurements by sweeping) can be configured to report. The interval for subsequent UL transmission can be configured or fixed. In one example, the subsequent UL transmission can be trigger-based, i.e., the UL transmission performs only when an event is satisfied.

In one example, the gNB 102 can configure UE 116 to receive DL RS at a panel with a DL beam (i.e., corresponding to a beam ID) and to send UL RS at another panel with a UL beam (i.e., corresponding to another beam ID), and configure UE 116 to measure both RSRPs of DL RS and UL RS (or either one, or other values obtained by using the two RSRPs, such as RSRP of DL RS over RSRP of UL RSRP) at the panel with the DL beam. The gNB 102 can configure the UE 116 to report the corresponding RSRPs (or other value(s)) in subsequent UL transmission(s). The interval for subsequent UL transmission(s) can be configured or fixed. In one example, the subsequent UL transmission can be trigger-based, i.e., the UL transmission performs only when an event is satisfied.

In one example, the gNB 102 can configure the UE 116 to periodically receive DL RS at a panel with a DL beam (i.e., corresponding to a beam ID) and to send UL RS by sweeping all (or part) of the UL beams at the other panels one-by-one for each periodicity, and configure the UE 116 to measure both RSRPs of DL RS and UL RS (or either one, or other values obtained by using the two RSRPs, such as RSRP of DL RS over RSRP of UL RSRP) for each periodicity. The gNB 102 can configure the UE 116 to report all or part of the corresponding RSRPs (or other value(s)) in subsequent UL transmission(s). In one example, only one representative RSRP value (e.g., maximum RSRP value among the measurements by sweeping) can be configured to report. The interval for subsequent UL transmission(s) can be configured or fixed. In one example, the subsequent UL transmission can be trigger-based, i.e., the UL transmission performs only when an event is satisfied.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. A user equipment (UE) comprising:
a transceiver configured to communicate via a multi-beam operation with a base station; and
a processor configured to:
receive, via the transceiver, configuration information for at least one of a downlink (DL) reception or an uplink (UL) transmission, wherein the configuration information comprises beam identifiers (IDs) and a slot and symbol configuration for respective ones of the one or more beam IDs, and
control the transceiver to perform, according to the configuration information, a DL operation or an UL operation, wherein:
the slot and symbol configuration include a slot pattern comprising one or more downlink slots, one or more uplink slots, and a number of flexible slots, and
the number of flexible slots comprise a symbol pattern including one or more downlink symbols, one or more uplink symbols, and a number of flexible symbols configured on a beam-specific basis,
wherein the transceiver is further configured to receive a quantity of configured beam IDs provided in a first parameter, and
wherein the quantity of configured beam IDs is configured by the first parameter in an information element and when the quantity of configured beam IDs has a value N, N different DL/UL slot and symbol patterns are configured and each of the slot and symbol patterns is associated with a corresponding beam ID.

2. The UE of claim 1,
wherein a first flexible slot from the number of flexible slots corresponding to a first beam includes a first symbol pattern and the first flexible slot corresponding to a second beam includes a second symbol pattern.

3. The UE of claim 1, wherein to perform the DL operation or the UL operation, the processor is configured to control the transceiver to at least one of:
perform the DL operation or the UL operation according to the configuration information associated with a second beam, a spatial filter, of a reference signal that has a quasi-located (QCL) relationship assumption with a first beam, the spatial filter, or the reference signal, respectively, or
perform the DL operation or the UL operation according to one of: a predefined rule, a fixed configuration, or a default configuration.

4. The UE of claim 1, wherein the configuration information comprises a first slot configuration for a first beam associated with a first beam ID and a second slot configuration for a second beam associated with a second beam ID, the first slot configuration different than the second slot configuration, and
wherein a slot pattern comprises a number of multiple configured beam IDs provided using a second parameter, the second parameter comprising a number of slot DL and UL patterns, wherein each of the slot DL and UL patterns is associated with a respective beam ID.

5. The UE of claim 1, wherein a number of two or more cell-specific DL/UL patterns are configured that apply to one or multiple UEs within a serving cell and wherein each TDD-UL-DL-ConfigCommonis associated with a SS/PBCH block (SSB) configured for the serving cell.

6. The UE of claim 1, wherein the UE is dynamically triggered in an aperiodic or semi-persistent manner, via lower-layer control signaling to be configured with DL or UL directions associated with the configured beam ID(s).

7. The UE of claim 1, wherein the configuration information includes a beam-specific UL/DL TDD pattern that configures DL and UL directions associated with a set of one or multiple configured beam IDs that are used in a group-common signaling for slot format indication.

8. A base station (BS) comprising:
a transceiver configured to communicate with at least one user equipment (UE) via a multi-beam operation; and
a processor operably coupled to the transceiver, the processor configured to:
transmit, via the transceiver, configuration information for at least one of adownlink (DL) reception or an uplink (UL) transmission, wherein the configuration information comprises beam identifiers (IDs) and a slot and symbol configuration for respective ones of the one or more beam IDs;
control the transceiver to perform, according to the configuration information, a DL operation or an UL operation, wherein:
the slot and symbol configuration include a slot pattern comprising one or more downlink slots, one or more uplink slots, and a number of flexible slots, and
the number of flexible slots comprise a symbol pattern including one or more downlink symbols, one or more uplink symbols, and a number of flexible symbols configured on a beam-specific basis; and
transmit, via the transceiver, a quantity of configured beam IDs provided in a first parameter,
wherein the quantity of configured beam IDs is configured by the first parameter in an information element and when the quantity of configured beam IDs has a value N, N different DL/UL slot and symbol patterns are configured and each of the slot and symbol patterns is associated with a corresponding beam ID.

9. The BS of claim 8, wherein a first flexible slot from the number of flexible slots corresponding to a first beam includes a first symbol pattern and the first flexible slot corresponding to a second beam includes a second symbol pattern.

10. The BS of claim 8, wherein to perform the DL operation or the UL operation, the processor is configured to control the transceiver to at least one of:
perform the DL operation or the UL operation according to the configuration information associated with a second beam, a spatial filter, of a reference signal that has a quasi-located (QCL) relationship assumption with a first beam, the spatial filter, or the reference signal, respectively, or
perform the DL operation or the UL operation according to one of: a predefined rule, a fixed configuration, or a default configuration.

11. The BS of claim 8, wherein the configuration information comprises a first slot configuration for a first beam associated with a first beam ID and a second slot configuration for a second beam associated with a second beam ID, the first slot configuration different than the second slot configuration, and
wherein a slot pattern comprises a number of multiple configured beam IDs provided using a second parameter, the second parameter comprising a number of slot DL and UL patterns, wherein each of the slot DL and UL patterns is associated with a respective beam ID.

12. The BS of claim 8, wherein a number of two or more cell-specific DL/UL patterns are configured that apply to one or multiple UEs within a serving cell and wherein each TDD-UL-DL-ConfigCommon is associated with a SS/PBCH block (SSB) configured for the serving cell.

13. The BS of claim 8, wherein the processor is further configured to trigger the UE dynamically in an aperiodic or semi-persistent manner, via lower-layer control signaling to be configured with DL or UL directions associated with the configured beam ID(s).

14. The BS of claim 8, the configuration information includes a beam-specific UL/DL TDD pattern that configures DL and UL directions associated with a set of one or multiple configured beam IDs that are used in a group-common signaling for slot format indication.

15. A method for a beam-specific operation between a base station (BS) and a user equipment (UE), the method comprising:
obtaining configuration information for at least one of a downlink (DL) reception or an uplink (UL) transmission, wherein the configuration information comprises beam identifiers (IDs) and a slot and symbol configuration for respective ones of the one or more beam IDs,
performing, according to the configuration information, a DL operation or an UL operation, wherein:
the slot and symbol configuration include a slot pattern comprising one or more downlink slots, one or more uplink slots, and a number of flexible slots, and
the number of flexible slots comprise a symbol pattern including one or more downlink symbols, one or more uplink symbols, and a number of flexible symbols configured on a beam-specific basis, and
receiving a quantity of configured beam IDs provided in a first parameter,
wherein the quantity of configured beam IDs is configured by the first parameter in an information element and when the quantity of configured beam IDs has a value N, N different DL/UL slot and symbol patterns are configured and each of the slot and symbol patterns is associated with a corresponding beam ID.

16. The method of claim 15, wherein a first flexible slot from the number of flexible slots corresponding to a first beam includes a first symbol pattern and the first flexible slot corresponding to a second beam includes a second symbol pattern.

17. The method of claim 15, wherein performing the DL operation or the UL operation comprises at least one of:
performing the DL operation or the UL operation according to the configuration information associated with a second beam, a spatial filter, of a reference signal that has a quasi-located (QCL) relationship assumption with a first beam, the spatial filter, or the reference signal, respectively, or
performing the DL operation or the UL operation according to one of: a predefined rule, a fixed configuration, or a default configuration.

18. The method of claim 15, wherein the configuration information comprises a first slot configuration for a first beam associated with a first beam ID and a second slot configuration for asecond beamassociated with a second beam ID, the first slot configuration different than the second slot configuration, and
wherein a slot pattern comprises a number of multiple configured beam IDs provided using a second parameter, the second parameter comprising a number of slot DL and UL patterns, wherein each of the slot DL and UL patterns is associated with a respective beam ID.

19. The method of claim 15, wherein a number of two or more cell-specific DL/UL patterns are configured that apply to all UEs within a serving cell and wherein each TDD-UL-DL-ConfigCommon is associated with a SS/PBCH block (SSB) configured for the serving cell.

20. The method of claim 15, wherein:
the UE is dynamically triggered in an aperiodic or semi-persistent manner, via lower-layer control signaling to be configured with DL or UL directions associated with the configured beam ID(s), and
the configuration information includes a beam-specific UL/DL TDD pattern that configures DL and UL directions associated with a set of one or multiple configured beam IDs that are used in a group-common signaling for slot format indication.

* * * * *